(12) United States Patent
Hardy et al.

(10) Patent No.: US 7,445,030 B2
(45) Date of Patent: Nov. 4, 2008

(54) FLEXIBLE TUBULAR PIPE, ESPECIALLY FOR OIL PRODUCTION, HAVING A PTFE WINDING

(75) Inventors: Jean Hardy, Barentin (FR); Alain Coutarel, Mont-Saint-Aignan (FR)

(73) Assignee: Technip France (FR)

( * ) Notice: Subject to any disclaimer, the term of this patent is extended or adjusted under 35 U.S.C. 154(b) by 22 days.

(21) Appl. No.: 10/575,917

(22) PCT Filed: Oct. 13, 2004

(86) PCT No.: PCT/FR2004/002612

§ 371 (c)(1),
(2), (4) Date: Jul. 25, 2006

(87) PCT Pub. No.: WO2005/038327

PCT Pub. Date: Apr. 28, 2005

(65) Prior Publication Data

US 2007/0125438 A1    Jun. 7, 2007

(30) Foreign Application Priority Data

Oct. 17, 2003  (FR) .................................. 03 12162

(51) Int. Cl.
*F16L 11/16* (2006.01)

(52) U.S. Cl. ...................... 138/135; 138/131; 138/134; 138/129; 138/130

(58) Field of Classification Search ................. 138/134, 138/135, 129, 130, 144, 131, 132, 133
See application file for complete search history.

(56) References Cited

U.S. PATENT DOCUMENTS

| | | | | |
|---|---|---|---|---|
| 2,932,597 | A * | 4/1960 | St. John et al. | 156/190 |
| 4,402,346 | A * | 9/1983 | Cheetham et al. | 138/129 |
| 4,788,089 | A * | 11/1988 | Skipper | 428/34.9 |
| 4,791,966 | A | 12/1988 | Eilentropp | 138/154 |
| 4,800,109 | A * | 1/1989 | Washizu | 428/34.9 |
| 4,842,023 | A * | 6/1989 | Whitworth | 138/122 |
| 5,218,170 | A * | 6/1993 | Ferlier et al. | 174/120 R |
| 5,507,320 | A * | 4/1996 | Plumley | 138/126 |
| 5,730,188 | A | 3/1998 | Kalman et al. | 138/135 |
| 5,934,335 | A * | 8/1999 | Hardy | 138/131 |
| 6,354,333 | B1 * | 3/2002 | Dupoiron et al. | 138/135 |
| 6,843,278 | B2 * | 1/2005 | Espinasse | 138/134 |

FOREIGN PATENT DOCUMENTS

| | | |
|---|---|---|
| EP | 0 749 546 | 9/2000 |
| WO | WO 96/30687 | 10/1996 |
| WO | WO 01/33129 | 5/2001 |
| WO | WO 02/066878 A1 | 8/2002 |
| WO | WO 02/090818 A1 | 11/2002 |

OTHER PUBLICATIONS

International Search Report PCT/FR2004/002612 dated Mar. 7, 2005.

* cited by examiner

*Primary Examiner*—Patrick F Brinson
(74) *Attorney, Agent, or Firm*—Ostrolenk, Faber, Gerb & Soffen, LLP

(57) ABSTRACT

A flexible tubular pipe, for example, for the transport of hydrocarbons. The pipe comprises successive independent layers including helical coils of strips or different sections and at least one polymer sheath. At least one of the coils is a strip or strips of polytetrafluoroethylene (PTFE).

10 Claims, 1 Drawing Sheet

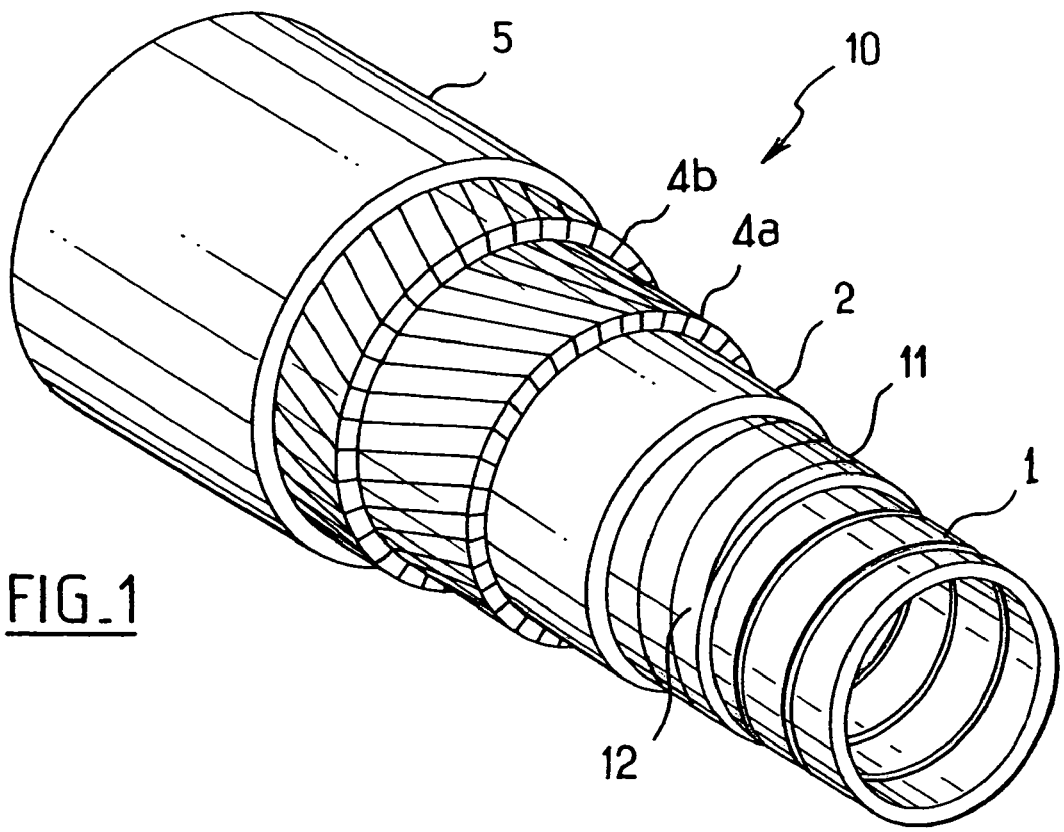
FIG_1
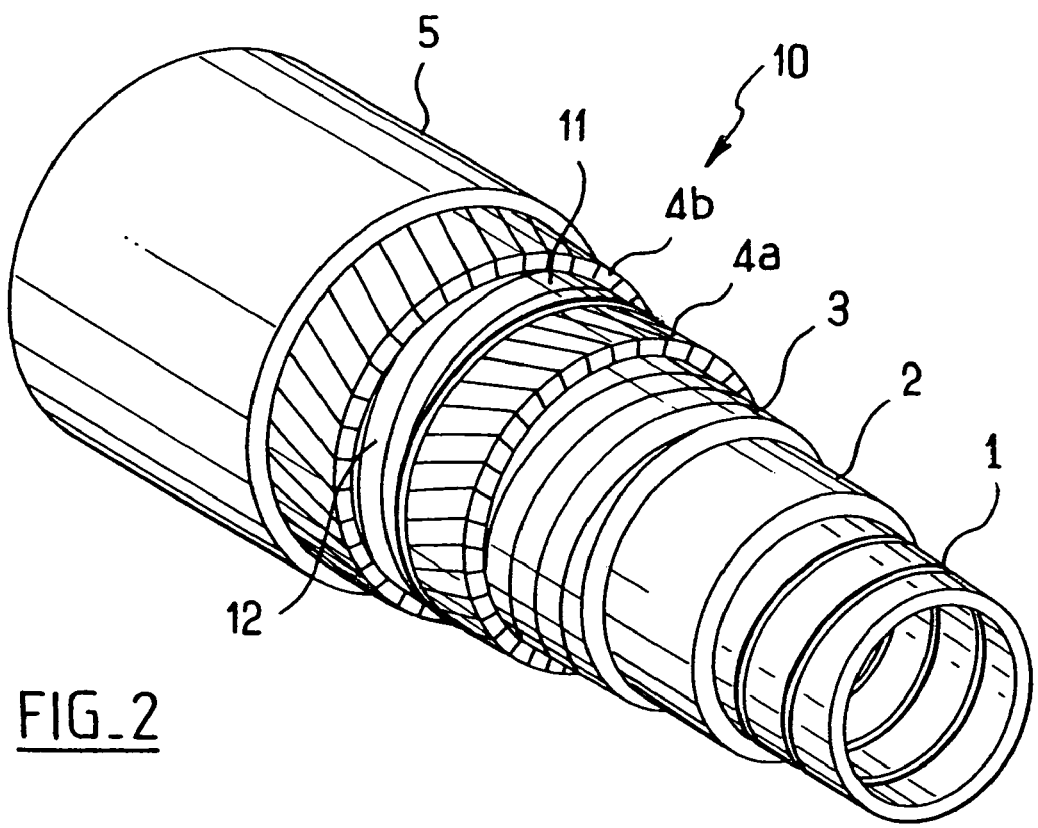
FIG_2

FLEXIBLE TUBULAR PIPE, ESPECIALLY FOR OIL PRODUCTION, HAVING A PTFE WINDING

CROSS REFERENCE TO RELATED APPLICATION

The present application is a 35 U.S.C.§§ 371 national phase conversion of PCT/FR2004/002612, filed Oct. 13, 2004, which claims priority of French Application No. 0312162, filed Oct. 17, 2003. The PCT International Application was published in the French language.

BACKGROUND OF THE INVENTION

The present invention relates to a flexible tubular pipe of the unbonded type, intended especially for the offshore oil industry, for example for transporting hydrocarbons, and produced by independent successive layers consisting, on the one hand, of helical windings of various profiled strips and/or tapes, especially made of metal, and, on the other hand, of at least one sheath made of polymer material. The various successive layers have a certain degree of freedom in moving with respect to one another, thereby ensuring good flexibility of the pipe.

A standard type of such flexible oil pipes comprises, from the inside outward: an internal carcass consisting of a short-pitch helical winding of a profiled strip (generally a metal strip) in mutually interlocked turns; a polymeric internal sealing sheath, or pressure sheath, pressing on the carcass and thus able to withstand external pressures without the risk of being crushed; a set of armor plies consisting of helical windings of profiled strips and intended to withstand in particular the hoop stress and the axial component of the internal pressure, and also the axial load due to the weight of the suspended pipe; and a polymeric external protective sheath. The set of armor plies is usually divided into two subsets more particularly responsible for taking up the radial stresses and the axial stresses respectively, namely the pressure vault and the tensile armor plies: the pressure vault is placed over the internal sealing sheath and is intended to withstand the external pressure but mainly the internal pressure developed by the fluid in the sealing sheath, and it generally comprises a short-pitch helical winding of an interlocked profiled wire (that is to say a winding with a wind angle of typically between 75° and about 90° to the axis of the pipe); the tensile armor plies are generally noninterlocked wires wound helically with a long pitch (i.e. with a lay angle of less than 55°) in at least two crossed plies on top of the pressure vault. However, in certain cases it is possible to have a set of armor plies consisting of only 55°-wound cross armor plies with no pressure vault.

Such a pipe, in its general form, is well known to those skilled in the art, especially from the standardized documents "Recommended practice for flexible pipe 17B" and "Specification for Unbonded Flexible Pipe 17J" from the American Petroleum Institute.

It has been known for a long time to use, in such a pipe, windings of very long tapes made of various extrudable polymers. These windings are interposed between various layers of metal windings and/or sheaths of the pipe with a great variety of technical functions.

There may for example be anti-wear or rub tapes, provided by the abovementioned document API 17J and illustrated for example in documents U.S. Pat. No. 5,730,188 or WO 01/33129, which tapes may be placed under, between and/or over the various armor plies.

There may be tapes for mechanical confinement and thermal and/or chemical protection, especially interposed between the carcass and the sealing sheath.

This is because the internal sealing sheath is commonly made either of a polyamide, especially nylon-11 (PA-11), such as RILSAN B®, or made of polyvinylidene fluoride (PVDF). In the first case, the operating temperature is limited as PA-11 has a susceptibility to hydrolysis that imposes a temperature limit in the presence of water, which depends on the planned lifetime of the pipe and on its design, but which, in certain cases, is about 90° C. In the second case, PVDF is limited in terms of service temperature, to about 130° C. or even 120° C., for other reasons (change in crystallinity and susceptibility to crack propagation after aging). Now, temperatures above 130° C. are encountered in the production of live crude. This is why manufacturers are proposing the interposition of a barrier layer between the carcass and the internal sealing sheath.

Thus, documents EP 0 749 546 and EP 0 817 935 teach a flexible pipe of the aforementioned type which includes, in addition, between the internal carcass and the internal sealing sheath, a sublayer made of elastomer, this sublayer being, in the most general embodiment, usually produced by extrusion. However, also provided, as a variant, are embodiments in which the sublayer is formed by an elastomer tape wound helically along the interstices or gaps in the internal carcass and penetrating to a greater or lesser depth into the interstices. This tape may also be made of a relatively soft elastomer and wound with touching turns in order to cover the entire internal carcass and to be partly forced into its gaps. The thickness of such an additional internal layer is around 0.5 mm to 5 mm (preferably 3 mm), whereas the polymeric sheath has a thickness of 1 to 30 mm (preferably 3 to 15 mm) for a metal carcass diameter of between 20 and 600 mm (preferably between 50 and 400 mm), said additional internal layer being designed to withstand internal pressures of greater than 100 bar, possibly pressures of up to or exceeding 1000 bar, and also to withstand high temperatures, exceeding 130° C. or even 150° C. The aforementioned documents do not give details about the preferred elastomers for the embodiment of these helical tapes, which are only one particular embodiment of a sublayer of the internal sealing sheath. In general, the elastomers used are proper elastomers, normally in the vulcanized or crosslinked state, or thermoplastic elastomers (TPES), these being chosen so that some of their properties are not degraded by the combination of the action of the various components present in the transported fluid and of the temperature of this fluid, while the material exposed to such conditions ages. Among the very many elastomers mentioned, thermoplastic polyolefin elastomers (TPOs) and fluoroelastomers are in particular noted. It has also been indicated that useful results are obtained with elastomers belonging to the silicone group. Document WO 02/090818 describes a flexible pipe of the same type with an intermediate layer wound between the carcass and the internal sealing sheath. The winding tapes may form a layer 5 to 10 mm in thickness. Examples of materials used are in particular polymers comprising 50% by volume of polyolefins (TPOs), as in the first two documents mentioned, polyketones, or other materials such as XPEs (crosslinked polyethylenes), PVDF and polypropylene.

According to document WO 02/066878 in the name of the Applicant, various possible constituents for the composition of a tape are given: one passage indicates that the tapes must be made of polyolefins, polyamides (preferably of the RILSAN® nylon-11 type), fluoropolymers (homopolymers or copolymers), whether modified or not (polyvinylidene fluoride (PVDF) or polyfluoroalkoxy) or hydrocarbon elastomers, fluoroelastomers or fluorosilicone elastomers (thermoplastic elastomer or thermoplastic urethane). This is therefore a very long list of materials having very varied properties, but these are obviously not suitable for the problem posed by the present invention since the limitations of some of the materials recommended in that document, such as RILSAN® or PVDF, have already been explained above.

Although many materials have thus been proposed, the ideal material, combining the possibility of being wound in the form of helical tapes and effective mechanical and chemical and thermal barrier properties, remains to be found.

SUMMARY OF THE INVENTION

In fields away from the oil industry, and especially away from the manufacture of flexible pipes, PTFE tapings have already been proposed. These are essentially in the electrical cable industry, as known for example from document U.S. Pat. No. 4 791 966. One characteristic of these PTFE tapes is, firstly, that they are extremely thin, typically from 30 to 200 μm in thickness, and, secondly, they do not require, when being processing for this application, to be of great length nor to be butted together in the event of a breakage, in so far as this is of no consequence for the quality of the end-product. It is clear that such small thicknesses are incompatible with the manufacture of flexible pipes, dissuading a person skilled in the art from considering PTFE for this.

The object of the invention is to propose such a material for producing flexible pipes of particularly high performance, even at high temperature.

The object of the invention is achieved by a flexible tubular pipe, especially designed for transporting hydrocarbons, produced by independent successive layers consisting, on the one hand, of helical windings of various profiled strips and/or tapes and, on the other hand, of at least one sheath made of polymer material, characterized in that at least one winding is produced from polytetrafluoroethylene (PTFE) tapes.

Advantageously, the pipe is of the known type comprising, from the inside outward: an internal carcass consisting of a winding of a profiled strip in mutually interlocked turns; an internal sealing sheath; a set of armor plies consisting of helical windings of profiled strips and a polymeric external protective sheath.

According to one advantageous embodiment of the invention, said winding produced from PTFE tapes constitutes an intermediate layer placed between the carcass and the internal sealing sheath.

According to another advantageous embodiment, said winding produced from PTFE tapes constitutes an intermediate layer placed between two armor plies of the flexible pipe.

These two embodiments may of course be combined.

The choice of PTFE is very surprising to a person skilled in the art since, although the properties of PTFE have been recognized for a long time and make this material desirable in many applications, it requires special processing, by compression molding and sintering, but not by conventional extrusion, as in the case of the thermoplastic polymers which a person skilled in the art normally uses in flexible pipe applications. This is because PTFE does not withstand the shear encountered in conventional extruders of the screw/barrel type or in conventional extruders for elastomers. The only extrusion of PTFE that is possible is that taking the form of a tube or profile carried out in special devices, especially cylinder/ram/die systems.

In fields away from the oil industry, and especially away from the manufacture of flexible pipes, PTFE tapings have already been proposed. These are essentially in the electrical cable industry, as known for example from document U.S. Pat. No. 4,791,966. One characteristic of these PTFE tapes is, firstly, that they are extremely thin, typically from 30 to 200 μm in thickness, and, secondly, they do not require, when being processing for this application, to be of great length nor to be butted together in the event of a breakage, in so far as this is of no consequence for the quality of the end-product. It is clear that such small thicknesses are incompatible with the manufacture of flexible pipes, dissuading a person skilled in the art from considering PTFE for this.

According to the invention, it has been discovered that it is possible nevertheless to use PTFE in order to produce helical windings for oil pipes (therefore pipes of relatively large diameter, of greater than 15 mm, preferably greater than 50 mm and possibly up to 600 mm or higher) and especially the intermediate winding between the carcass and the internal sealing sheath.

This is made possible using a PTFE in the form of relatively thick tapes, typically with a thickness of between 0.5 and 5 mm, produced in great length.

Long PTFE tapes are obtained by a conversion process whereby PTFE is subjected to the following steps: compression molding, then sintering, then skiving and longitudinal cutting (slitting), in the form of strips of width matched to the diameter of the desired winding and with a thickness of a few millimeters. The cut strips are then "welded together" in order to form long tapes.

The PTFE used is advantageously a PTFE chemically modified in order to further improve its mechanical properties, and most particularly its weldability, which makes it easier to manufacture long tapes. In particular, this is a PTFE modified by a perfluorinated comonomer, generally used in the manufacture of thermoplastic perfluoropolymers such as, for example, PFA (perfluoroalkoxy) and MFA (perfluoromethoxy—a tetrafluoroethylene/perfluoromethyl ether copolymer). Preferably, the comonomer is PPVE (perfluoro (n-propyl vinyl ether)), typically the TFM® form produced by Dyneon, and especially the 1600 grade, with about 0.1% by weight of PPVE. The low PPVE content is sufficient to allow interchain mobility, hence sintering; consequently, joining by "welding" is made possible. The thus TFM®-modified PTFE exhibits pseudo-weldability by sintering and therefore makes it possible to obtain long tapes by butt-welding elements of shorter length together.

BRIEF DESCRIPTION OF THE DRAWINGS

Other features and advantages of the invention will become apparent from the following description of two embodiments, given with reference to the appended drawings in which:

FIG. 1 is a partial perspective view of one embodiment of a flexible pipe according to the invention, with an intermediate winding of PTFE tapes between the carcass and the internal sealing sheath; and FIG. 2 is a partial perspective view of another embodiment of a flexible pipe according to the invention, with an intermediate winding of PTFE tapes between two armor plies.

DESCRIPTION OF THE PREFERRED EMBODIMENTS

This intermediate layer may be provided between the cross armor plies themselves, as shown in FIG. 2, and/or between pairs of such cross plies.

FIG. 1 shows the rough-bore flexible pipe 10, which comprises: the internal carcass 1 made of profiled metal strip or wire, with interlocked turns wound in a short pitch, designed to prevent the pipe from being crushed under external pressure; the polymeric internal sealing sheath 2; a structural armor assembly not comprising a pressure vault but only tensile armor plies 4a, 4b; and the polymeric external protective sheath 5. The armor plies 4a, 4b are wound in opposite senses with a lay angle of about 55°, and the internal and external pressures and the tensile stresses are exerted on or supported by these armor plies 4a, 4b; the flexible pipe is said to be balanced.

According to the invention, an intermediate layer 11 obtained by a short-pitch winding of modified PTFE tapes 12 is provided between the carcass 1 and the internal sealing sheath 2. Such an intermediate layer 11 provides effective protection of the polymeric sheath 2 from chemical and thermal attack by the effluents transported by the flexible pipe.

These modified-PTFE tapes 12 have a width of between 30 and 300 mm, preferably between 50 and 150 mm, and a thickness of between 0.5 and 5 mm, preferably between 1 and 2 mm. The multilayer thus obtained has a thickness of between 5 and 20 mm, depending on the configuration.

FIG. 2 shows a rough-bore flexible pipe 10 comprising: the internal carcass 1 made of interlocked metal strip; the polymeric internal sealing sheath 2; a structural armor assembly comprising here the pressure vault 3 and the tensile armor plies 4a, 4b; and the polymeric external protective sheath 5.

The pressure vault 3 is formed by a short-pitch helical winding of interlocked profiled wire, for example with a T, Z or U profile. The pressure vault 3 is intended to take up the radial component of the internal pressure of the effluents in the flexible pipe.

The tensile armor plies consist of two superposed cross plies 4a, 4b each formed by the long-pitch helical winding of armor wires. The lay angle measured along the longitudinal axis is typically less than 55° when there is a pressure vault 3, as shown in FIG. 2.

According to the invention, an intermediate layer 11 obtained by a short-pitch winding of modified-PTFE tapes 12 is provided between the tensile armor plies 4a and 4b, this layer being for example intended to reduce the rubbing under contact pressure that exists between the armor plies.

This intermediate layer may be provided between the cross armor plies themselves, as shown in FIG. 2, and/or between pairs of such cross plies.

In both embodiments shown in FIGS. 1 and 2, the intermediate layer 11 is deposited by a taping machine known per se.

The structural armor assembly may comprise other layers (not shown), such as wound hoop reinforcement layers, or anti-wear layers, or intermediate sheaths, or other tensile armor plies.

The invention claimed is:

1. A flexible tubular pipe for transporting hydrocarbons, comprising
   independent outwardly successive layers of helical windings of various profiled strips
   comprising from the inside outward: an internal carcass comprised of a winding of a profiled strip in mutually interlocked turns; a set of armor plies comprising helical windings of at least some of the profiled strips;
   the pipe comprising an internal sheath outward of the carcass and a polymeric external protective sheath outward of the armor plies; and
   at least one of the helical windings comprises a polytetrafluoroethylene (PTFE) tape disposed as one of the layers and located between the carcass and the external protective sheath.

2. The pipe as claimed in claim 1, wherein the winding comprised of a polytetrafluoroethylene (PTFE) tape is an intermediate layer between the carcass and the internal sealing sheath.

3. The pipe as claimed in claim 1, wherein the winding comprised of a polytetrafluoroethylene (PTFE) tape is an intermediate layer placed between two of the armor plies.

4. The pipe as claimed in claim 1, wherein the PTFE tape has a thickness of between 0.5 mm and 5 mm.

5. The pipe as claimed in claim 1, wherein the PTFE tape comprises PTFE modified by a perfluorinated comonomer.

6. The pipe as claimed in claim 1, the PTFE tape comprises PTFE modified by PPVE (perfluoro(n-propyl vinyl ether)).

7. A flexible tubular pipe for transporting hydrocarbons, comprising independent outwardly successive layers of helical windings of various profiled strips, at least one of the helical windings comprises a polytetrafluoroethylene (PTFE) tape, wherein the PTFE tape is a long tape comprising welded together elements of shorter length of PTFE tape; and
   the layers including at least one sheath comprised of polymer material between two other layers.

8. The pipe as claimed in claim 7, wherein the PTFE tape comprises PTFE modified by a perfluorinated comonomer.

9. The pipe as claimed in claim 7, the PTFE tape comprises PTFE modified by PPVE (perfluoro(n-propyl vinyl ether)).

10. The pipe as claimed in claim 7, wherein the PTFE tape has a thickness of between 0.5 mm and 5 mm.

\* \* \* \* \*